(12) United States Patent
Torigoe et al.

(10) Patent No.: US 6,916,551 B2
(45) Date of Patent: Jul. 12, 2005

(54) THERMAL BARRIER COATING MATERIAL, GAS TURBINE PARTS AND GAS TURBINE

(75) Inventors: Taiji Torigoe, Takasago (JP); Sunao Aoki, Takasago (JP); Kazutaka Mori, Takasago (JP); Ikuo Okada, Takasago (JP); Kouji Takahashi, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 255 days.

(21) Appl. No.: 10/274,132

(22) Filed: Oct. 21, 2002

(65) Prior Publication Data
US 2003/0087120 A1 May 8, 2003

(30) Foreign Application Priority Data
Oct. 24, 2001 (JP) ........................................ 2001-326462

(51) Int. Cl.[7] .............................. B32B 15/04; F03B 3/12
(52) U.S. Cl. ...................... 428/633; 428/697; 428/699; 428/701; 428/702; 428/632; 428/304.4; 428/307.3; 416/241 B
(58) Field of Search ................................. 428/632, 633, 428/469, 650, 655, 680, 304.4, 472, 701, 702, 307.3; 501/103, 126, 152; 416/241 B

(56) References Cited

U.S. PATENT DOCUMENTS 3,645,786 A * 2/1972 Tannenberger et al.
4,753,902 A * 6/1988 Ketcham
6,025,078 A * 2/2000 Rickerby et al.

FOREIGN PATENT DOCUMENTS

| EP | 0 812 931 A1 | 12/1997 |
| EP | 0 825 271 A1 | 2/1998 |
| EP | 1 400 611 A1 | 3/2004 |
| JP | 2001-348655 | 12/2001 |
| JP | 2002-69607 | 3/2002 |

OTHER PUBLICATIONS

European Search Report, Apr. 23, 2004, 02023380.5–2119.

* cited by examiner

*Primary Examiner*—Jennifer McNeil
(74) *Attorney, Agent, or Firm*—Oblon, Spivak, McClelland, Maier & Neustadt, P.C.

(57) ABSTRACT

A thermal barrier coating material can prevent spall-off from occurring during operation at high temperatures and has a high heat insulating effect. A turbine parts and a gas turbine that are protected with the thermal barrier coating material are also provided. The thermal barrier coating material of the present invention comprises a ceramic layer 23, which is formed on a high temperature heat-resistant alloy base 21 to protect the base 21 from high temperatures, the ceramic layer 23 being applied via a bonding coat layer 22 provided as a metal bonding layer and is made of $ZrO_2$ with $Er_2O_3$ added thereto as a stabilizing agent. The turbine parts and the gas turbine of the present invention are coated with the thermal barrier coating material on the surfaces thereof.

21 Claims, 4 Drawing Sheets

THERMAL BARRIER COATING MATERIAL, GAS TURBINE PARTS AND GAS TURBINE

BACKGROUND OF THE INVENTION

1. Field of the Invention

The present invention relates to a thermal barrier coating material, a gas turbine parts, and a gas turbine that have high durability and, more particularly, relates to the constitution of a ceramic layer used as a top coat for the thermal barrier coating material.

2. Description of the Related Art

It has been attempted in recent years to improve the thermal efficiency of thermal power generation as part of efforts to reduce energy consumption. To improve the thermal efficiency of a gas turbine used in thermal power generation, it is effective to raise the temperature at the gas inlet, which may often be set to about 1500° C. Operating a power generator at such a high temperature requires building stationary vanes and rotor blades that constitute the gas turbine and/or the wall of a combustor with materials that can endure the high temperature. The turbine blades are made of heat-resistant metal but cannot endure such high temperatures. Therefore, it is common in practice for heat-resistant metal to be coated, via a metal bonding layer, with a thermal barrier coating material (TBC) made by forming a ceramic layer made of an oxide ceramic by thermal spraying or other process, for the protection from high temperatures. For the ceramic layer, a $ZrO_2$-based material, particularly YSZ (Yttria stabilized Zirconia), which is $ZrO_2$ stabilized partially or completely with $Y_2O_3$ is preferably used for the relatively lower thermal conductivity and relatively higher thermal expansion coefficient thereof among various ceramic materials.

However, when the stationary vane and/or the rotor blade of a gas turbine are coated with a thermal barrier coating material formed from a ceramic layer made of YSZ, the inlet temperature of the gas turbine may exceed 1500° C. depending on the type of gas turbine, giving rise to the possibility of a part of the ceramic layer spalling off under harsh operating conditions, thus losing the heat resistance. While a gas turbine of closed construction that can collect carbon dioxide has recently been developed in order to reduce greenhouse gas emissions, it is expected that the inlet temperature will reach around 1700° C. and the surface temperature of the turbine blade will reach around 1300° C. in this type of gas turbine. Thus, it is required to further improve the heat resistance of thermal barrier coating material for turbine blades.

BRIEF SUMMARY OF THE INVENTION

The present invention has been made in consideration of the problems described above, and an object thereof is to provide a thermal barrier coating material that can prevent spall-off from occurring during operation at high temperatures and has a high heat insulating effect.

Another object of the present invention is to provide a turbine parts and a gas turbine that are protected by the thermal barrier coating material.

Spall-off of the ceramic layer made of YSZ occurs because of insufficient crystalline stability of the YSZ at high temperatures and insufficient durability against high thermal stresses. The present inventors have researched the constitution of a thermal barrier coating material that can improve the crystalline stability of the YSZ at high temperatures and the thermal cycle durability of the ceramic layer. The present invention has been completed upon finding that the durability of the thermal barrier coating material can be improved by forming a ceramic layer from $ZrO_2$ stabilized with $Er_2O_3$. Hereinafter, the $ZrO_2$ stabilized with $Er_2O_3$ will be referred to as "ErSZ".

The thermal barrier coating material of the present invention comprises a ceramic layer comprising $ZrO_2$ and $Er_2O_3$. The $Er_2O_3$ functions as a stabilizing agent. The thermal barrier coating material of such a composition has higher crystalline stability at higher temperatures than ceramic layers made of the YSZ of the prior art, thus making it possible to achieve excellent thermal cycle durability. The thermal barrier coating material of the present invention is preferably formed on a high temperature heat-resistant alloy base in order to improve the heat resistance of the base.

In the case in which the thermal barrier coating material comprising the ceramic layer made of YSZ is used on high temperature components such as turbine parts, there has been a problem in that phase transformation occurs in the YSZ due to the exposure to high temperatures over a long period of time, resulting in deterioration of heat insulating performance and volume change that causes stress in the ceramic layer leading to cracks. This is because the YSZ layer formed on the surface of the turbine parts by thermal spraying is a metastable tetragonal system (t' phase) generated through quenching from the molten or half-molten state. When the YSZ in a t' state is exposed to high temperatures for a long period of time, phase transformation occurs in the YSZ from the metastable t' phase to the t phase (tetragonal system). The t phase, that is, a high-temperature phase, transforms into an m phase (monoclinic system) while changing the volume when the temperature of YSZ decreases, for example as the turbine stops rotation. Since the transformation from the t phase to the m phase is accompanied by a significant volume change, the YSZ layer is subjected to great stresses that cause cracks. It is supposed that growth of the cracks causes part of the YSZ layer to spall off, resulting in deterioration of the heat insulating performance of the thermal barrier coating material.

The ceramic layer comprising $ZrO_2$ stabilized with $Er_2O_3$ employed in the present invention, in contrast, has high crystalline stability that makes phase transformation less likely to occur than in a ceramic layer made of YSZ. Therefore, occurrence of stress due to phase transformation can also be restricted. Thus the thermal barrier coating material of the present invention achieves high thermal cycle durability.

DETAILED DESCRIPTION OF THE INVENTION

In the thermal barrier coating material according to the present invention, the $Er_2O_3$ content in the ceramic layer preferably ranges from 8% to 27% by weight.

In the thermal barrier coating material according to the present invention, the $Er_2O_3$ content in the ceramic layer more preferably ranges from 10% to 25% by weight.

In the thermal barrier coating material according to the present invention, the $Er_2O_3$ content in the ceramic layer even more preferably ranges from 15% to 20% by weight.

When the $Er_2O_3$ content in the ceramic layer made of ErSZ is set in a range described above, a thermal barrier coating material having higher crystalline stability and higher thermal cycle durability can be made. The present inventors have verified the validity of the range for the value of the $Er_2O_3$ content described above through experiments which will be described in detail in conjunction with examples.

The thermal barrier coating material of the present invention may also have fine pores formed in the ceramic layer, wherein a volume ratio of the pores in the ceramic layer is from 8% to 15%. When the volume ratio of the pores in the ceramic layer (hereinafter referred to as the void ratio) is controlled to be within the range described above, the heat insulating performance of the ceramic layer can be improved by the pores while mitigating thermal stresses that are generated in the ceramic layer by thermal cycles, thus yielding a thermal barrier coating material having excellent thermal cycle durability.

The thermal barrier coating material of the present invention may also have a metal bonding layer, that has high durability against oxidation, provided between the base and the ceramic layer. In such a constitution, the metal bonding layer can mitigate the thermal stress generated due to the differences in the linear thermal expansion coefficient between the base and the ceramic layer, thus achieving better thermal cycle durability. The metal bonding layer also contributes to strengthening of the thermal barrier coating material by bonding the base and the ceramic layer more strongly.

In order to achieve the objects described above, the present invention provides a gas turbine parts protected with the thermal barrier coating material described above, and a gas turbine provided with the gas turbine parts. With such a constitution, the gas turbine parts can have higher heat resistance and better thermal cycle durability, thus enabling the building of a gas turbine that has higher reliability.

Next, preferred embodiments of the present invention will be described with reference to the accompanying drawings.

Figure 1:
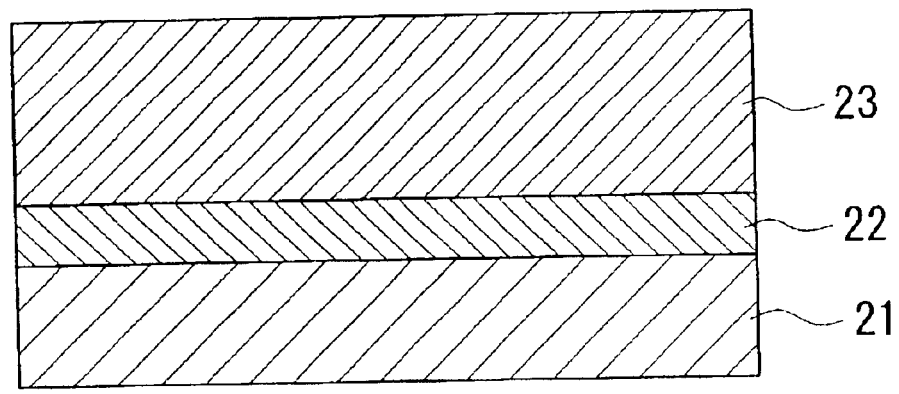
FIG. 1 is a schematic sectional view showing a thermal barrier coating material film of the present invention.

FIG. 1 is a schematic sectional view showing the structure of the thermal barrier coating film for which the thermal barrier coating material of the present invention is used. The thermal barrier coating film is made by forming a bonding coat 22, made of an MCrAlY alloy or the like as a metal bonding layer having high corrosion resistance and high oxidation resistance, on a high temperature heat-resistant alloy base 21 such as a rotor blade, and forming thereon a ceramic layer 23 made of $ZrO_2$ stabilized with $Er_2O_3$ (hereinafter referred to as ErSZ) as a top coat. The letter M in the MCrAlY alloy that constitutes the bonding coat 22 represents a metal element, for example a metal element such as Ni, Co or Fe, or a combination of two or more kinds thereof.

The bonding coat 22 reduces the stress caused by the difference in the thermal expansion coefficient between the base 21 and the ceramic layer 23, so as to prevent the ceramic layer 23 from spalling off the bonding coat 22. The bonding coat 22 can be formed by a low-pressure plasma thermal spray process, electron beam deposition or the like.

In the ceramic layer 23 made of ErSZ, the content of $Er_2O_3$ that is added as a stabilizing agent ranges from 8% to 27% by weight. When the $Er_2O_3$ content is set in this range, the thermal barrier coating material of this embodiment can exhibit higher thermal cycle durability. When the $Er_2O_3$ content is out of the range described above, thermal cycle durability deteriorates significantly. That is, when the $Er_2O_3$ content is lower than 8% by weight, a monoclinic system (m phase) remains in the ceramic layer 23 and lowers the durability. When the $Er_2O_3$ content exceeds 25%, a tetragonal system becomes dominant in the ceramic layer 23 and the proportion of the t' phase that has excellent durability decreases, thereby lowering the durability.

The $Er_2O_3$ content more preferably ranges from 10% to 25% by weight, and most preferably ranges from 15% to 20% by weight. A thermal barrier coating material having even higher thermal cycle durability can be made by controlling the $Er_2O_3$ content to be in such ranges.

The void ratio (volume ratio of the pores formed in the ceramic layer 23 to the volume of the ceramic layer 23) is preferably from 8% to 15%. When the void ratio is below 8%, the ceramic layer is dense and has a high Young's modulus that makes it more likely to spall off when a high thermal stress is generated. When the void ratio exceeds 15%, adhesion with the bonding coat becomes weak and the durability decreases. The ceramic layer 23 can be formed by an atmospheric plasma thermal spray process or an electron beam deposition process using $ZrO_2$—$Er_2O_3$ powder. The $ZrO_2$—$Er_2O_3$ powder used in the atmospheric plasma thermal spray process can be prepared by the procedure described below.

First, $ZrO_2$ powder and $Er_2O_3$ powder in quantities of predetermined proportions are prepared. These powders are mixed with a binder and a dispersant in a ball mill so as to form a slurry. The slurry is granulated and dried with a spray drier and is turned into a solid solution in a diffusion heat treatment, thereby producing a composite powder of $ZrO_2$—$Er_2O_3$.

A ceramic layer made of ErSZ is formed by thermal spraying of the composite powder onto the bonding coat 22. In the case in which the ceramic layer 23 is formed by the electron beam deposition process, an ingot made by sintering or electrically melting and solidifying the raw material that has the predetermined composition is used.

The thermal barrier coating material having the constitution described above can be usefully applied to high-temperature components such as stationary vanes and rotor blades of an industrial gas turbine, or the inner tube or tail pipe of a combustor. Besides industrial gas turbines, the thermal barrier coating material of the present invention can be applied to the thermal barrier coating material film for high-temperature components such as engines of automobiles and jet planes. By coating such members with the thermal barrier coating material of the present invention, gas turbine parts or other high-temperature components having high thermal cycle durability can be produced.

Figure 4:
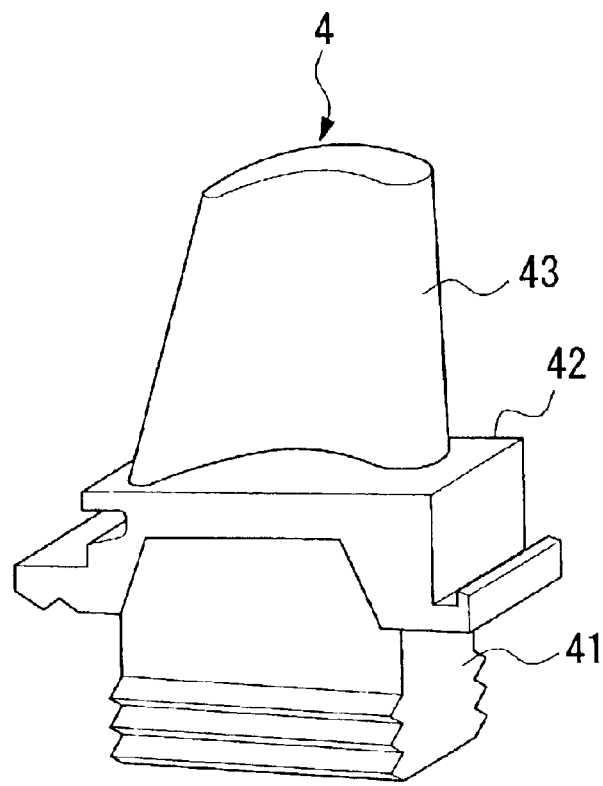
FIG. 4 is a perspective view showing a rotor blade as an example of a turbine parts of the present invention.
Figure 5:
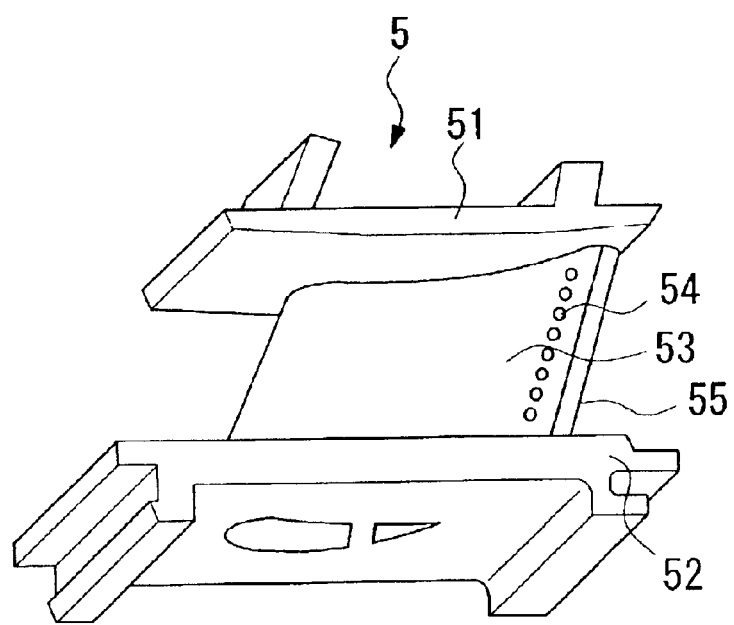
FIG. 5 is a perspective view showing a stationary vane as an example of a turbine parts of the present invention.

FIG. 4 and FIG. 5 are perspective views showing examples of turbine blade (turbine parts) constitution to which the thermal barrier coating material of the embodiment described above can be applied.

The gas turbine rotor blade 4 shown in FIG. 4 includes a dove tail 41 fixed on a disk side, a platform 42, a blade 43 and other portions. A gas turbine stationary vane 5 shown in FIG. 5 comprises an inner shroud 51, an outer shroud 52, blade 53 and other portions, while the blade 53 has seal fin cooling holes 54 and slit 55 formed therein.

Figure 6:
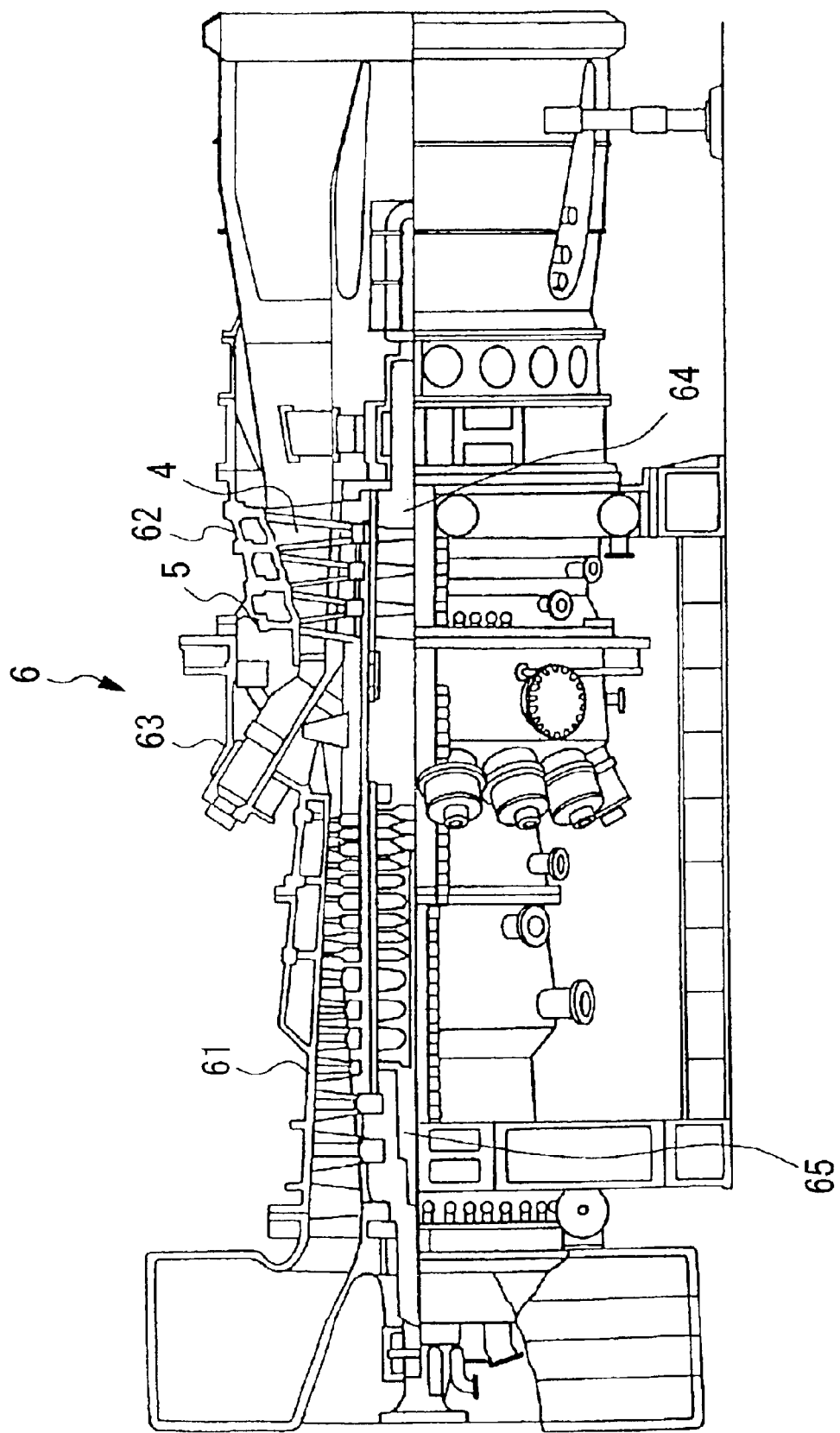
FIG. 6 is a partial sectional view showing an example of a gas turbine having the turbine parts shown in FIG. 4 and FIG. 5.

A gas turbine that can employ the turbine blades 4 and 5 shown in FIGS. 4 and 5 will be described below with reference to FIG. 6. FIG. 6 is a partial sectional view schematically showing the gas turbine according to the present invention.

The gas turbine 6 comprises a compressor 61 and a turbine 62 directly connected to each other. The compressor 61 is constituted, for example, as an axial flow compressor, that draws in atmospheric air or a predetermined gas through an inlet port and compresses it to a high pressure as a working fluid. Connected to an outlet port of the compressor 61 is the combustor 63, so that the working fluid discharged from the compressor 61 is heated to a predetermined inlet temperature of the turbine by the combustor 63. The working fluid heated to the predetermined temperature is then supplied to the turbine 62. As shown in FIG. 6, the gas turbine rotor blade 4 is installed in several stages (4 stages in FIG. 6) in the casing of the turbine 62. The gas turbine rotor blade 4 is mounted on a main shaft 64 so as to constitute one stage together with each of the stationary vanes 5. One end of the main shaft 64 is connected to a rotary shaft 65 of the compressor 61, and the other end is connected to a rotary shaft of a generator (not shown).

When a working fluid that has a high temperature and a high pressure is supplied from the combustor 63 into the casing of the turbine 62, the working fluid expands in the casing so as to drive the main shaft 64 to rotate, and the generator (not shown) that is connected to the gas turbine 6 is driven to operate. That is, pressure of the working fluid is decreased via the gas turbine stationary vane 5 that is secured onto the casing while generating kinetic energy that is converted into rotational torque via the gas turbine rotor blade 4 mounted on the main shaft 65. Rotational torque is transmitted to the main shaft 64 to thereby drive the generator.

The gas turbine rotor blade is usually made of a heat-resistant alloy (for example, alloy CM247L, commercially available from Cannon-Muskegon Corporation), and a gas turbine stationary vane is usually made of a heat-resistant alloy (for example, alloy IN938, commercially available from Inco Limited). This means that the turbine blades are made of heat-resistant alloys as a base to which the thermal barrier coating material according to the present invention can be applied. Therefore, turbine blades having high heat insulating effect and high spall-off resistance can be made by applying the thermal barrier coating material of the present invention to the turbine blades. Thus, the turbine blades can be used at higher temperatures with greater durability for longer periods of time. Ability to operate at higher temperatures means that the working fluid can be heated to a higher temperature, making it possible to improve the heat efficiency of the gas turbine.

According to the embodiment described above, since the top coat is composed of the ceramic layer 23 which has a higher crystalline stability and high thermal cycle durability than YSZ, higher heat insulating effect and higher spall-off resistance than in the prior art can be achieved. Thus, a thermal barrier coating material that has a high durability and can be used at higher temperatures than in the prior art can be made.

Moreover, gas turbine parts that show sufficient durability at temperatures higher than those tolerable in the prior art can be made by coating high-temperature components of gas turbines with the thermal barrier coating material of the present invention. The present invention is not limited by the following examples.

EXAMPLES

The present invention will now be described in more detail and the effects of the present invention will be made clear by way of examples.

Example 1

In this example, samples having ErSZ layers formed from $ZrO_2$ with varying $Er_2O_3$ content were fabricated and tested to measure the thermal cycle life, in order to determine the change in the thermal cycle life with the changing quantity of $Er_2O_3$ content. Ni-based heat-resistant alloy with the composition of Ni—16Cr—8.5Co—1.7Mo—2.6W—1.7T—0.9Nb—3.4Al—3.4Ti was used for the base of the samples. After sand-blasting the base surface with $Al_2O_3$ particles, the surface was coated with a CoNiCrAlY alloy that has a composition of Co—32Ni—21Cr—8Al—0.5Y by a low-pressure plasma thermal spray process so as to form a bonding coat layer. Then a ceramic layer (ErSZ layer) was formed by an atmospheric plasma thermal spray process on the bonding coat layer made of the CoNiCrAlY alloy, thereby forming the thermal barrier coating material. The $Er_2O_3$ content in the ceramic layers of different samples (samples Nos. 1 to 12) are shown in Table 1.

The bonding coat layer (CoNiCrAlY) was formed to a thickness of 0.1 mm and the ceramic layer (ErSZ) was formed to a thickness of 0.5 mm on all samples.

A comparative sample was made using YSZ in the ceramic layer. The $Y_2O_3$ content in the ceramic layer made of YSZ was set to 8% by weight and the void ratio was set to 10% (sample No. 13).

Sample No. 13 having the ceramic layer made of YSZ is the thermal barrier coating material film that has been used in the gas turbine stationary vane and rotor blade of the prior art.

Figure 2:
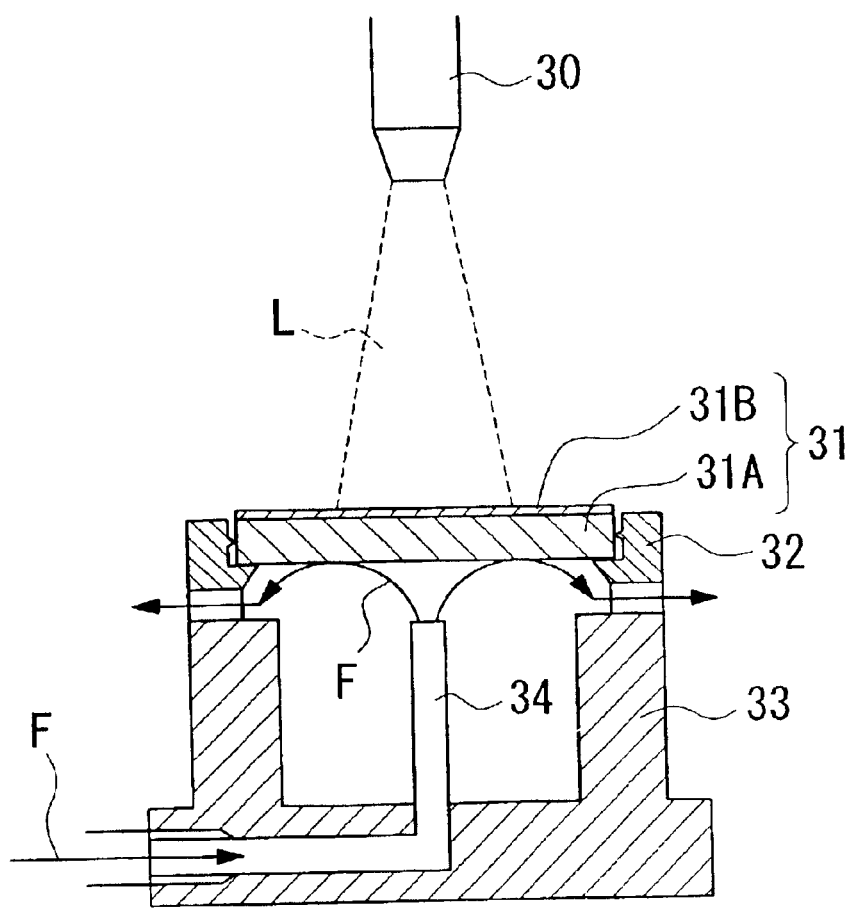
FIG. 2 is a schematic sectional view showing a laser thermal cycle test apparatus used in examples of the present invention.

The samples fabricated as described above were tested to evaluate the thermal cycle durability. FIG. 2 is a schematic sectional view of a laser thermal cycle test apparatus used in evaluation of the thermal cycle durability in this example. The laser thermal cycle test apparatus has a sample holder 32 placed on a main body 33 for holding a sample 31, that consists of the base 31A having the thermal barrier coating material 31 formed thereon, in a direction such that the thermal barrier coating material 31B faces outward, while the sample 31 is heated by irradiating on the side of the thermal barrier coating material 31B with laser light L generated by a $CO_2$ laser 30. While heating by the laser 30, the sample 31 is cooled on the back surface at the same time as gas flow F that is supplied from a cooling gas nozzle 34 disposed in the main body 33 at a position that faces the back surface of the sample 31.

Figure 3A:
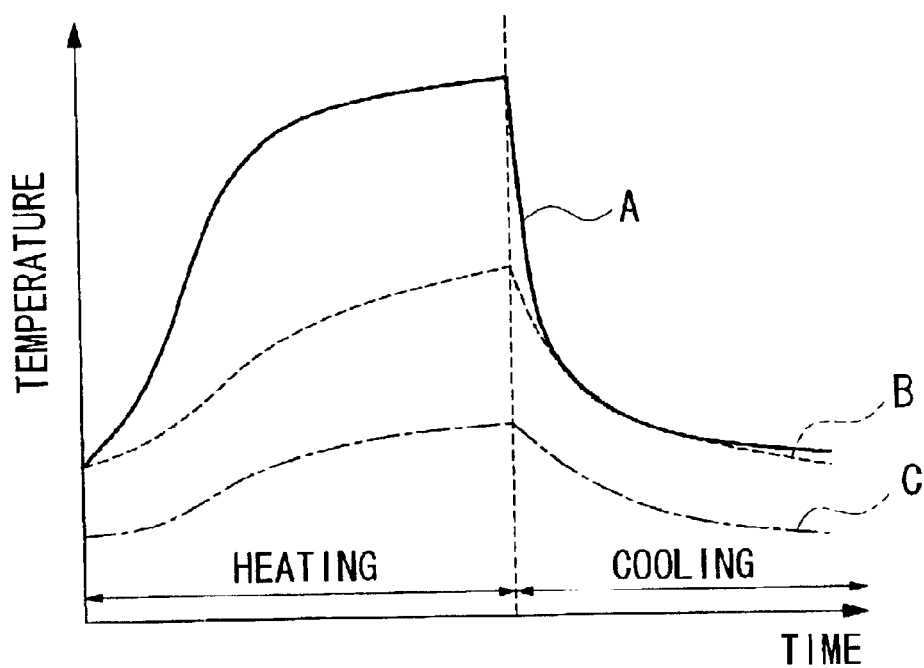
FIG. 3A is a graph showing the temperature change of the sample during thermal cycle tests using the laser thermal cycle test apparatus shown in FIG. 2.
Figure 3B:
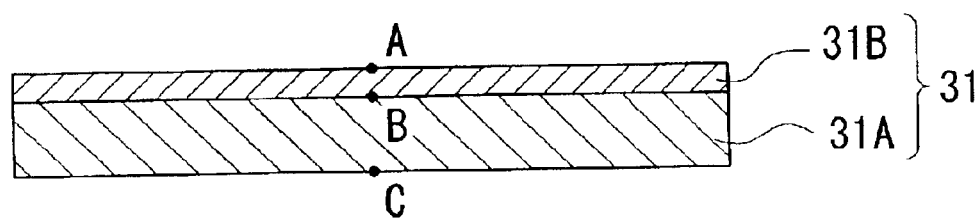
FIG. 3B shows the measuring points on the sample corresponding to the curves of FIG. 3A.

With the laser thermal cycle test apparatus having the constitution described above, a temperature gradient can be easily generated in the sample 31, and the performance of the sample can be evaluated for the operation in the case in which the present invention is applied to high-temperature components such as gas turbine parts. FIG. 3A is a graph schematically showing the temperature change of the sample that is subjected to the thermal cycle test on the apparatus shown in FIG. 2. Curves A to C in the graph correspond to temperature measuring points A to C on the sample 31 shown in FIG. 3B. As shown in FIG. 3, the apparatus shown in FIG. 2 is capable of heating the sample 31 so that the temperature is highest on the front surface (A) of the thermal barrier coating material film 31B, lower in the interface (B) between the thermal barrier coating material film 31B and the base 31A, and lowest on the back surface (C) of the base 31A. Thus, the temperature distribution of an actual gas turbine in operation can be simulated by setting, for example, the temperature on the front surface of the thermal barrier coating material film 31B to be 1200° C. or higher, and setting the temperature in the interface between the thermal barrier coating material film 31B and the base 31A to range from 800 to 900° C. The temperature and temperature gradient achieved by the test apparatus can be easily controlled as desired by adjusting the output power of the laser 30 and the gas flow rate F.

In this example, a cycle of heating the thermal barrier coating material film surface to a maximum temperature of 1300° C. and heating the interface between the thermal barrier coating material film and the base to a maximum temperature of 950° C. was repeated using the thermal cycle test apparatus shown in FIG. 2, in a schedule of heating for 3 minutes and cooling for 3 minutes. The number of cycles that cause spall-off in the thermal barrier coating material during the thermal cycle test is referred to as the thermal cycle life, and this is shown in Table 1.

As shown in Table 1, Samples Nos. 5 to 11 having an $Er_2O_3$ content ranging from 8% to 27% by weight proved to have higher thermal cycle durability than Sample No. 14 of the prior art constitution. Samples Nos. 6 to 10 having an $Er_2O_3$ content ranging from 10% to 25% by weight showed thermal cycle lives of 900 cycles or longer, indicating higher thermal cycle durability. Samples Nos. 7 to 9 having an $Er_2O_3$ content ranging from 15% to 20% by weight showed thermal cycle lives of 2000 cycles or longer, indicating extremely high durability.

TABLE 1

| Sample No. | $Er_2O_3$ content (Wt %) | Void ratio after thermal spraying | Thermal cycle life |
| --- | --- | --- | --- |
| 1 | 0 | 10% | 1 |
| 2 | 2 | 10% | 3 |
| 3 | 4 | 10% | 10 |
| 4 | 6 | 10% | 50 |
| 5 | 8 | 10% | 250 |
| 6 | 10 | 10% | 983 |
| 7 | 15 | 10% | 2103 |
| 8 | 18 | 10% | >3000 |
| 9 | 20 | 10% | 2231 |
| 10 | 25 | 10% | 964 |
| 11 | 27 | 10% | 220 |
| 12 | 30 | 10% | 50 |
| 13 | 35 | 10% | 1 |
| 14 | 8($Y_2O_3$) | 10% | 200 |

Example 2

Next, in order to study the change in durability with different void ratios in the ceramic layer made of ErSZ, samples were made by forming thermal barrier coating material films, having the ceramic layers of different void ratios shown in Table 2, on bases. Void ratios in the ceramic layers of these samples were set to predetermined values by controlling the thermal spray flow and distance. Samples Nos. 15 to 23 were made same manner as in Example 1, except for controlling the void ratio and setting the $Er_2O_3$ content to 18% by weight.

As shown in Table 2, samples Nos. 18 to 20 having void ratios of the ceramic layer within a range from 8% to 15% proved to have higher thermal cycle durability than the thermal barrier coating material film having the ceramic layer made of YSZ of the prior art shown in Table 1.

TABLE 2

| Sample No. | $Er_2O_3$ content (Wt %) | Void ratio after thermal spraying | Thermal cycle life |
| --- | --- | --- | --- |
| 15 | 18 | 2% | 5 |
| 16 | 18 | 4% | 15 |
| 17 | 18 | 6% | 150 |
| 18 | 18 | 8% | 894 |
| 19 | 18 | 12% | >3000 |
| 20 | 18 | 15% | 1576 |
| 21 | 18 | 20% | 165 |
| 22 | 18 | 25% | 50 |
| 23 | 18 | 30% | 3 |

As described in detail above, the thermal barrier coating material of the present invention is less likely to experience phase transition even when exposed to a high temperature for a long period of time, since the ceramic layer provided as the top coat is made of ErSZ that has higher crystalline stability than the conventional material of YSZ. As a result, the thermal barrier coating material can endure higher operating temperatures than in the prior art.

The gas turbine parts of the present invention is protected with the thermal barrier coating material comprising the ceramic layer provided as the top coat made of ErSZ that has higher crystalline stability than the conventional material of YSZ, and can endure higher operating temperatures than those tolerable in the prior art.

What is claimed is:

1. A thermal barrier coating material comprising a ceramic layer comprising $ZrO_2$ and $Er_2O_3$, wherein the ceramic layer has fine pores formed therein, and a void ratio in the ceramic layer ranging from 8% to 15%.

2. The thermal barrier coating material according to claim 1, formed on a high temperature heat-resistant alloy base.

3. The thermal barrier coating material according to claim 1, wherein the $Er_2O_3$ content of the ceramic layer ranges from 8% to 27% by weight.

4. The thermal barrier coating material according to claim 1, wherein the $Er_2O_3$ content of the ceramic layer ranges from 10% to 25% by weight.

5. The thermal barrier coating material according to claim 1 wherein the $Er_2O_3$ content of the ceramic layer is within a range from 15% to 20% by weight.

6. The thermal barrier coating material according to any one of claims 1, 3, 4 and 5, further comprising a metal bonding layer provided between the ceramic layer and a base layer.

7. Gas turbine parts coated with the thermal barrier coating material of claim 6.

8. A gas turbine comprising the gas turbine parts of claim 7.

9. Gas turbine parts coated with the thermal barrier coating material of any one of claims 1, 3, 4 and 5.

10. A gas turbine comprising the gas turbine parts of claim 9.

11. A thermal barrier coating material comprising a ceramic layer consisting essentially of $ZrO_2$, and $Er_2O_3$, a base layer and a metal bonding layer provided between the ceramic layer and the base layer.

12. The thermal barrier coating material according to claim 11, formed on a high temperature heat-resistant alloy base.

13. The thermal barrier coating material according to claim 11, wherein the $Er_2O_3$ content of the ceramic layer ranges from 8% to 27% by weight.

14. The thermal barrier coating material according to claim 11, wherein the $Er_2O_3$ content of the ceramic layer ranges from 10% to 25% by weight.

15. The thermal barrier coating material according to claim 11 wherein the $Er_2O_3$ content of the ceramic layer ranges from 15% to 20% by weight.

16. The thermal barrier coating material according to any one of claims 11, 13, 14 and 15, wherein the ceramic layer has fine pores formed therein and a void ratio in the ceramic layer ranging from 8% to 15%.

17. A gas turbine part coated with the thermal barrier coating material of claim 16.

18. A gas turbine comprising the gas turbine part of claim 17.

19. A gas turbine part coated with the thermal barrier coating material of any one of claims 11, 13, 14 and 15.

20. A gas turbine comprising the gas turbine part of claim 19.

21. A thermal barrier coating material comprising a ceramic layer consisting essentially of $ZrO_2$ and $Er_2O_3$, wherein the ceramic layer has fine pores formed therein, and a void ratio in the ceramic layer ranging from 8% to 15%.

* * * * *